Figure 1:
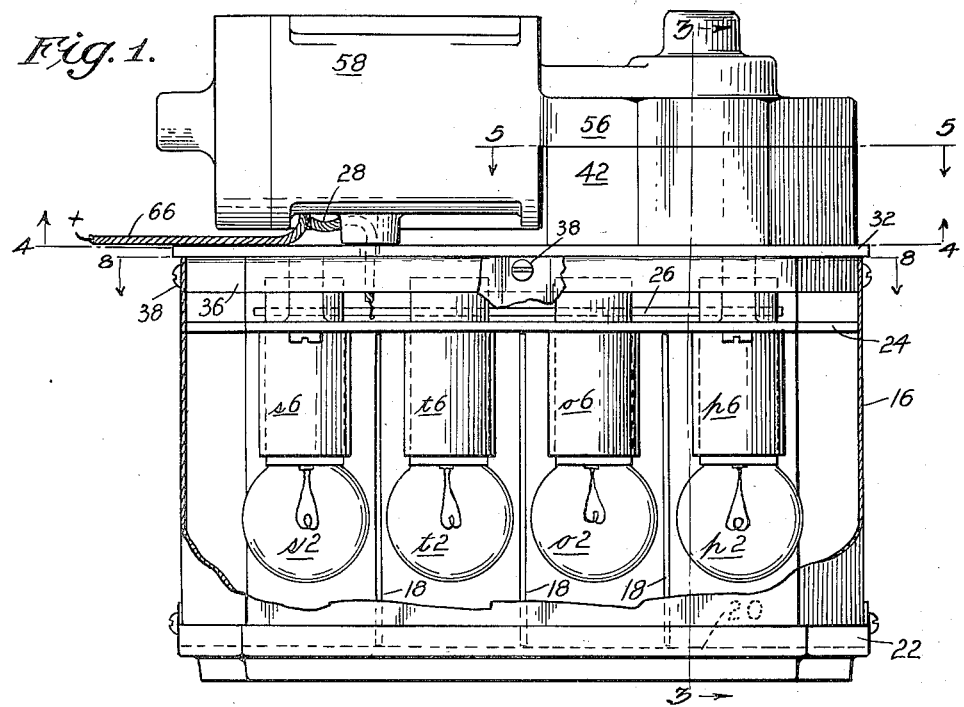

Dec. 16, 1930.  H. M. SMITH  1,784,884
VEHICLE STOP SIGNAL
Filed Dec. 9, 1926  3 Sheets-Sheet 2
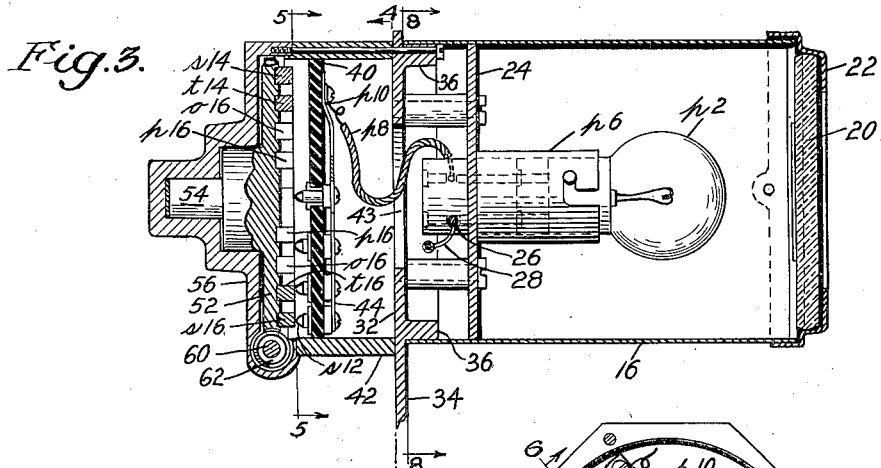
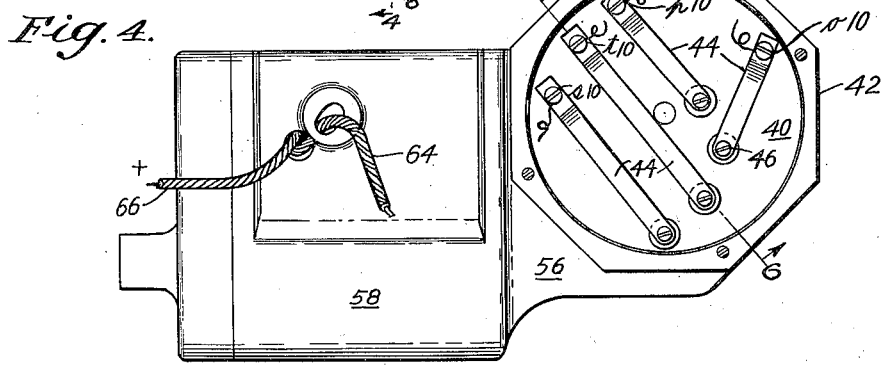
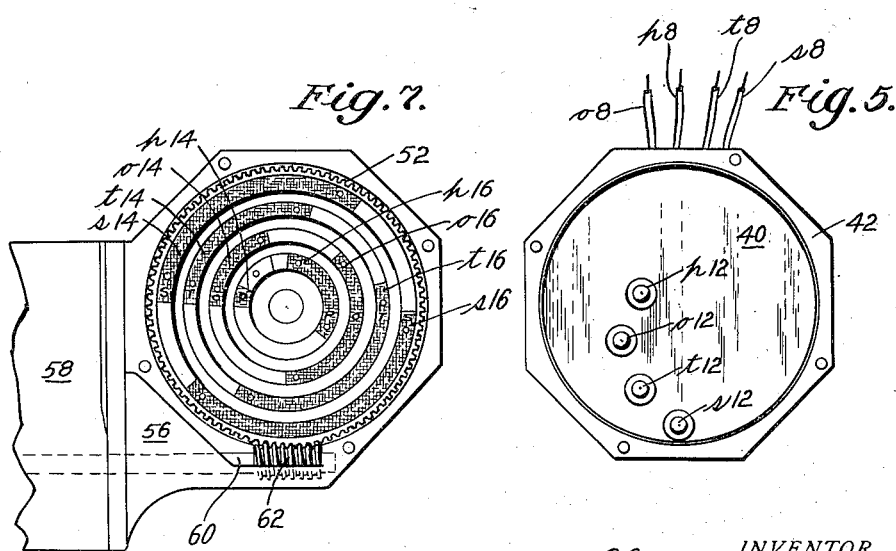
INVENTOR
Harry M. Smith
BY M. C. Frank
ATTORNEY Dec. 16, 1930.                H. M. SMITH                1,784,884
                         VEHICLE STOP SIGNAL
                    Filed Dec. 9, 1926      3 Sheets-Sheet 3
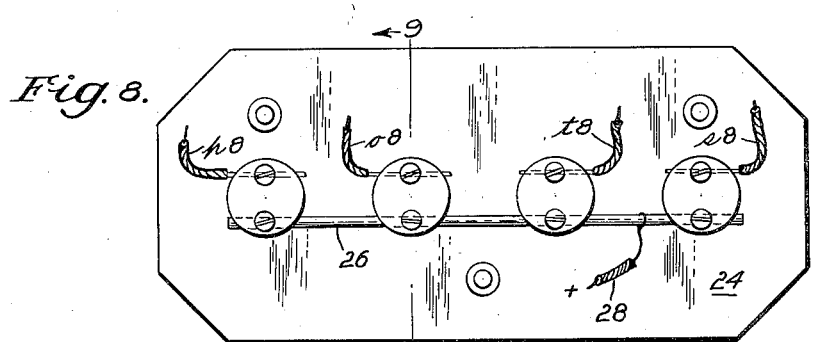
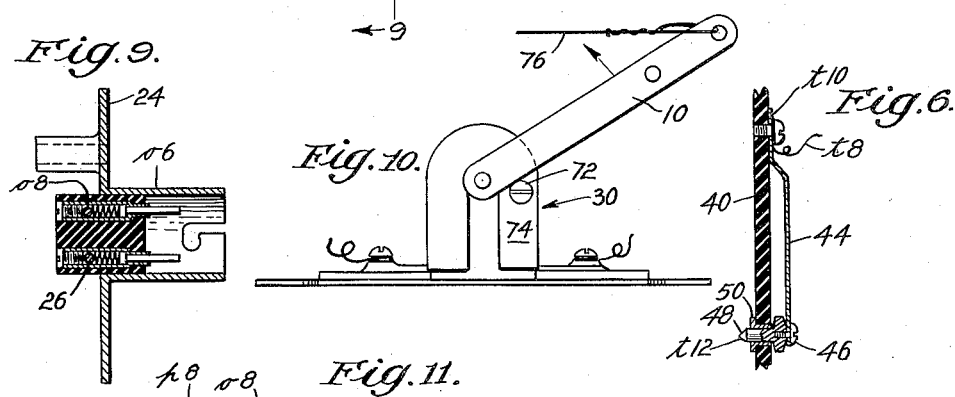
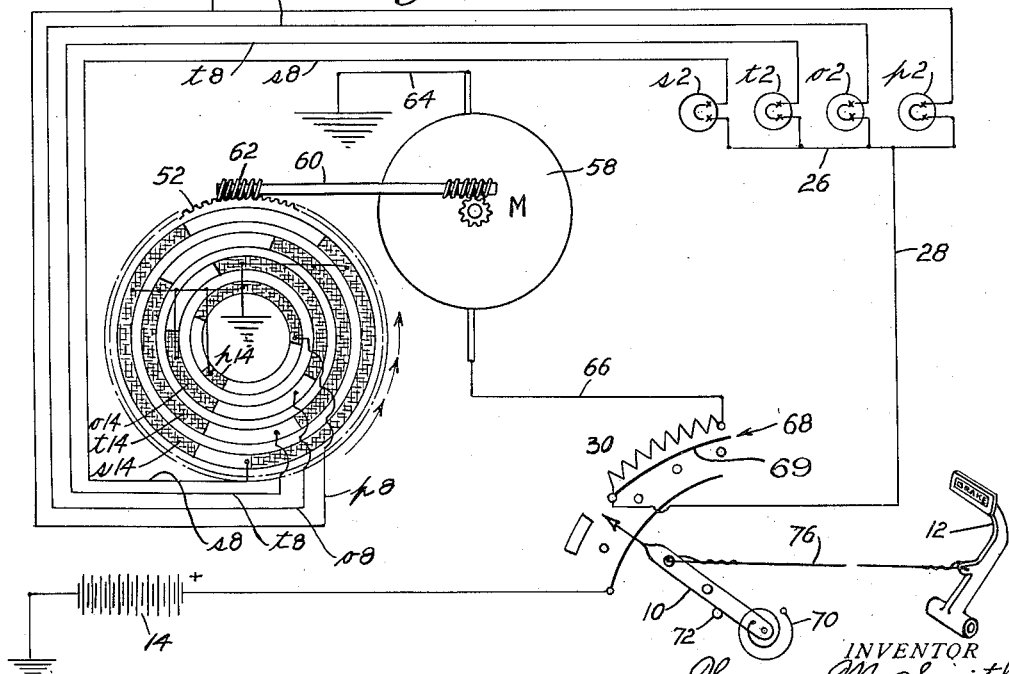
INVENTOR
Harry M. Smith
BY
M. C. Frank
ATTORNEY Patented Dec. 16, 1930

1,784,884

UNITED STATES PATENT OFFICE

HARRY M. SMITH, OF ALAMEDA, CALIFORNIA

VEHICLE STOP SIGNAL

Application filed December 9, 1926. Serial No. 153,514.

My invention relates to signals for informing traffic of a driver's intention to slow down or stop his vehicle, and to various refinements of and improvements upon past devices of this character.

Stop lights are in such general use that they have come to be relied upon by motorists, and it is one object of my invention to increase their reliability. It is an object of my invention to provide stop lights with a factor of safety such that the burning out of a single electric light bulb does not incapacitate the signal.

It is further an important object of my invention to provide a stop signal which is adapted more certainly to attract attention than any prior device I am aware of. I mean to sharply differentiate my stop light from the customary vehicle tail light so that the driver of a following automobile will have the signal so impressed upon his mind that he cannot, even subconsciously, disregard it; and in furtherance of this object, I provide means for repeatedly calling visual attention to the signal so that momentary distractions will not prevent reaction to the signal.

It is a further object of my invention to provide a signal which is responsive to variation in the intensity of brake application.

These are the primary objects of my invention, and other objects will suggest themselves as the description proceeds, or will be suggested by the use of the device of my invention. It will be understood that various modifications are possible within the purview of the invention, and therefore I desire to not be circumscribed beyond the limits of the claims finally determining my invention.

Figure 2:
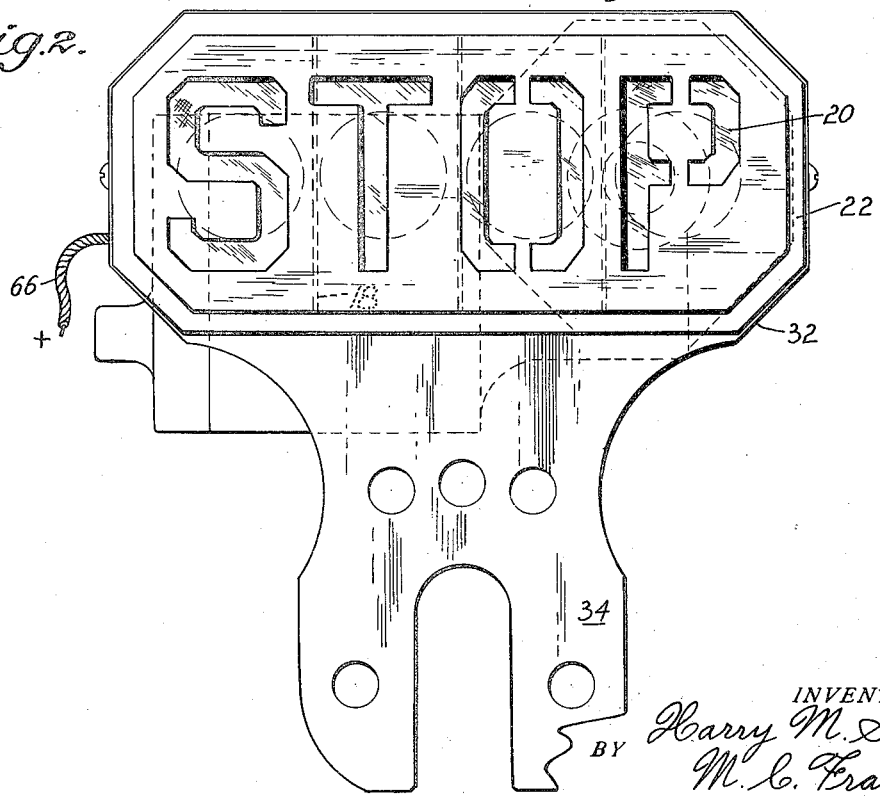

Referring to the drawings:

Figure 1 is a plan of my signal, with a portion of the lamp-box broken away to disclose the individual electric bulbs. Fig. 2 is a front elevation of the signal. Fig. 3 is a vertical section through one lamp compartment and axially through the rotatable flasher-switch; the plane of section is indicated by the line 3—3 in Fig. 1.

Fig. 4 is a detail front elevation of the back of the fixed contact brush-block of the flasher-switch and of the switch-operating motor, as they appear when the lamp cover, casing, and socket assembly have been removed; the view would correspond to a section on the line 4—4 and viewed in the direction of the arrows in Figs. 1 and 3. Fig. 5 is a detail elevation of the front of the fixed contact brush-block of the flasher-switch, taken on the line 5—5 in Figs. 1 and 3. Fig. 6 is an inclined transverse section longitudinally through one brush of the fixed contact brush-block; the plane of section is indicated by a line 6—6 in Fig. 4. Fig. 7 is an elevation of the rotatable contact-block of the flasher-switch, and would correspond to a face view on the same line 5—5, but viewed in the opposite direction from the incidence of Fig. 5 in Figs. 1 and 3; the device is assembled with the face illustrated in Fig. 5 placed against the face illustrated in Fig. 7, to produce the partial assembly illustrated in Fig. 4.

Fig. 8 is a rear elevation of the lamp-socket block, and would corresponding to a view taken on the line 8—8 in Figs. 1 and 3. Fig. 9 is a vertical section of the lamp-socket block through the middle of one of the sockets; the plane of section is indicated by a line 9—9 in Fig. 8. Fig. 10 is detail elevation of the main rheostat-switch for operating the signal when the brake is applied. Fig. 11 is a wiring diagram of the circuit.

The common form of vehicle stop signal consists of an electric lamp, the lens of which having translucent red letters S, T, O, P formed therein, and has a switch operated by a lever such as lever 10, Figs. 10 and 11, from the brake pedal 12 of an automobile, to connect the electric lamp in circuit with the storage battery 14, Fig. 11, of the automobile. In this form of signal a single bulb is relied upon to illuminate the entire word "Stop" and this word is illuminated the entire time the brake pedal is depressed.

In my improved signal I make use not of a single bulb, but of four bulbs s2, t2, o2, and p2, each housed in a separate compartment of a lamp-box 16. The compartments are formed by three dividing walls 18 extending to the lens 20. The lens is retained by a metal lamp-cover 22 having the letters S, T, O, P, stenciled therein to spell the word "stop". The four bulbs s2, t2, o2, and p2 are respectively behind the letters S, T, O, and P of the cover, and the dividing walls occupy spaces between these letters, so that each one may be illuminated separately. The lamp-base is a plate 24 with four openings across its length, and has a standard two-terminal automobile type lamp socket s6, t6, o6, p6, soldered into each opening. The sockets, one of which is illustrated in Fig. 9, are of well-known standard construction and will not be described in detail. A bus bar 26 connects one terminal of each socket to a wire 28 leading through a switch 30 to the positive pole of the storage battery 14.

The lamp back is bolted to a broad supporting plate 32, Figs. 1 and 3, having a depending bracket 34 to provide for its attachment, in convenient position to the automobile. Flanges 36 on the plate, telescope into and hold the lamp-box 16. A series of bolts 38 may be added to secure the box to these flanges.

The device of my invention is described with reference to automobiles using a "ground return"; that is, in which the negative pole of the storage battery is grounded to the frame of the car. Assuming the switch 30 to be closed, it is necessary merely to connect the negative terminal of each bulb to "ground" in order to light it.

Means are provided for lighting each of the bulbs s2, t2, o2, and p2 separately to successively illuminate each letter of the word "stop". Each bulb has its negative terminal connected by wires s8, t8, o8, and p8, to one of the brush terminals s10, t10, o10, or p10, of a fixed brush block 40 of a flasher switch. The brush block is a disk of insulating material retained within an open-faced watch-like casing 42 which is bolted to the back of the supporting plate 32 in registry with an opening 43, Fig. 3, therein for passing therethrough the wires s8, t8, o8, and p8. Resilient brass bars 44, Figs. 4 and 6, connect each terminal, by means of a screw 46, with the heads of one of the brushes s12, t12, o12 and p12, Fig. 5. The brushes are the well-known brass pins having rounded tips 48 projecting through sleeves 50 in the insulating plate disk 40, and transfer the current from the binding posts on one side of the disk, through the disk to the rotary contact block of the flasher switch.

The rotary contact block of the flasher switch is formed on the radial face of a worm gear 52 of steel, Fig. 7, or other suitable material having a stub shaft 54 integral therewith. The stub shaft is journaled, and the gear housed in an integral extension 56 of the driving-motor housing 58. The housing 58 is bolted to the open face of the housing 42 opposite the supporting plate 32, and is thereby supported from the plate 32 and retained in operative position. The motor within this housing is a standard direct current machine and need not be described in detail. The armature shaft 60, of the motor, has its outer end provided with a worm 62 in mesh with the worm gear 52. One motor terminal 64 leads direct to "ground", and the other terminal 66 is connected in parallel with the electric bulbs of the signal, to the main switch 30, so that the rotary contact block is driven whenever the signal is operated. Four annular grooves are formed in the radial face of the gear 52, and segmental annular blocks s14, t14, o14, and p14, are secured within these grooves in position to contact respectively with the brushes s12, t12, o12, and p12 in the juxtaposed fixed contact brush disk 40. Referring to Figs. 5, 7, 11, it will be seen, that the brushes are positioned out of radial lines, while the leading tips of all the contact bars are in radial line, (assuming counter clockwise rotation). As the rotary contact block gear 52 rotates, Fig. 11, the contact bar s14 first contacts with the brush s12. Since the contact bar is uninsulated from its gear and housing, the brush s12 is connected to "ground" by this contact, and so the bulb s2 has its negative terminal grounded, thus completing a circuit through the bulb, and illuminating the letter S of the stop sign. As the contact block rotates further, the bars t14, o14, and p14 are successively contacted with their respective brushes, and cause each of the other letters of the stop sign to light up in succession. Continued rotation beyond this point brings the trailing ends of the bars out of contact with the brushes all at the same time, and the stop sign is flashed off at once.

A second series of contact bars s16, t16, o16, and p16 are also provided on the contact block. These bars have both their leading and trailing edges arranged for simultaneous operation of all the lights. The contact block is continuously rotated so long as the switch 30 is closed; and the stop signal continues to flash the letters first successively into illumination, then simultaneously into darkness, then simultaneously into illumination for a fractional period and then simultaneously into darkness; repeating this cycle as long as the switch is held closed.

The motor terminal 66, in one modified form of my device is connected directly in parallel with the electric bulbs but I prefer to incorporate in the main switch 30, a rheostat 68 to regulate the speed of the motor, so that the signal cycle will be speeded up when the brake is applied hard for a quick stop. The arm 10 which operates the switch is also connected to the variable arm of the rheostat 68 in series with the motor. A coil spring 70 urges the arm 10 against a stop 72 on the switch block 74 to open-circuit position, and a cord 76 connects the arm 10 to the linkage of the brake pedal 12, so that, when the pedal is slightly depressed the lamp is connected directly in series with the storage battery and the motor is connected thereto through full resistance of the rheostat for slow rotation. As the brake pedal is depressed further, resistance is cut out, and the motor speeds up to produce a rapidly flashing warning signal of most distinctive character. A low resistance shunt 69 is provided in the rheostat for the lamp circuit.

I intend to pluralize the aforedescribed device by adding similar "right" and "left" turn signals, but to describe these analogous signals in detail would unduly complicate the present description.

I claim:

1. In combination with a vehicle having a brake lever, an electric signal circuit, switch means in said signal circuit for periodically closing the same, a normally open motor circuit, a motor in said motor circuit operative to actuate said switch means, a rheostat in said motor circuit for varying the resistance thereof, and a second switch in said signal circuit operable upon an actuation of said brake lever to close said signal circuit thereat and to simultaneously cooperate with said rheostat for closing the motor circuit therethrough in such manner that an increased degree of brake lever displacement is arranged to effect an increased frequency of closing of said first switch means.

2. In combination with a vehicle brake, a stop signal comprising an electric "stop" sign, and means actuated by the brake pedal while the same is in a displaced position thereof for alternately flashing said sign and for varying the timing of said flashing in such manner that the flashing rate for the sign increases with the degree of displaced setting of the brake pedal.

3. In combination with a vehicle having a brake and a brake lever associated therewith, a flashing light stop signal, flashing means for the signal, a rheostat for controlling the flashing rate of said means, and means associated with said brake lever for operating said rheostat in such manner that the flashing rate of said signal progressively increases as said lever is progressively moved to effect higher degrees of setting of the brake controlled thereby.

4. In combination with a vehicle having a brake and a brake lever associated therewith, a light signal, means for periodically flashing said signal, and means automatically operable in accordance with the degree of displacement of said brake lever to set the brake for varying the rate of flashing of said signal in direct accordance with the said degree of displacement of said brake lever.

In testimony whereof, I affix my signature.

HARRY M. SMITH.